(12) United States Patent
Aaron (10) Patent No.: US 12,285,004 B2
(45) Date of Patent: Apr. 29, 2025

(54) PORTABLE, COLLAPSIBLE OCEAN FISHING AND GAME HUNTING SYSTEM

(71) Applicant: James Michael Aaron, Haltom City, TX (US)

(72) Inventor: James Michael Aaron, Haltom City, TX (US)

( * ) Notice: Subject to any disclaimer, the term of this patent is extended or adjusted under 35 U.S.C. 154(b) by 276 days.

(21) Appl. No.: 17/967,635

(22) Filed: Oct. 17, 2022

(65) Prior Publication Data
US 2024/0122174 A1    Apr. 18, 2024

(51) Int. Cl.
*A01M 31/02* (2006.01)
*A01K 97/22* (2006.01)
*B62D 63/06* (2006.01)

(52) U.S. Cl.
CPC ............ *A01M 31/02* (2013.01); *A01K 97/22* (2013.01); *B62D 63/061* (2013.01)

(58) Field of Classification Search
CPC .... A01M 31/02; A01M 31/025; A01M 31/00; A01K 97/22; B62D 63/061
See application file for complete search history.

(56) References Cited

U.S. PATENT DOCUMENTS

| | | | |
|---|---|---|---|
| 3,220,766 A | 11/1965 | Kates | |
| 3,509,891 A | 5/1970 | de Bolt | |
| 5,033,493 A | 7/1991 | Senchuck | |
| 5,295,555 A * | 3/1994 | Strange | E06C 5/04 |
| | | | 182/127 |
| 5,409,081 A | 4/1995 | Reeves | |
| 5,564,523 A | 10/1996 | Howard | |
| 6,119,812 A | 9/2000 | Chin | |
| 6,460,653 B1 | 10/2002 | Hardy | |

(Continued)

*Primary Examiner* — Babajide A Demuren (57) ABSTRACT

A collapsible system for water body fishing and game hunting comprises a folding frame with an attached platform, all made from galvanized aluminum. The folding frame includes a front left and front right vertical pipe, and a left bent angle and right bent angle pipe, with the left bent angle and right bent angle pipe joined at a vertex with an attached towing hitch. The folding frame also uses horizontal and diagonal braces attachable and connecting the front left and front right vertical pipe to the left bent angle and right bent angle pipe with a lower left horizontal brace and lower right horizontal brace attached to a lower rear horizontal brace or lower front horizontal brace so as to pivot. The folding frame further comprising a rear horizontal stability brace/platform holder and a front horizontal stability brace/platform holder attachable to a left side horizontal stability brace/platform holder and a right side horizontal stability brace/platform holder, with the attached rear horizontal stability brace/platform holder, front horizontal stability brace/platform holder, left side horizontal stability brace/platform holder, and right side horizontal stability brace/platform holder supporting a platform. The attachable components facilitate folding and collapsing the folding frame including the left side horizontal stability brace/platform holder and the right side horizontal stability brace/platform holder attached to the front left and front right vertical pipe and the left bent angle and right bent angle pipe so as to pivot allowing the platform to fold down opposite from the vertex.

20 Claims, 2 Drawing Sheets

(56) References Cited

U.S. PATENT DOCUMENTS

| | | | |
|---|---|---|---|
| 6,637,549 B1 | 10/2003 | Lopacki | |
| D519,647 S | 4/2006 | Watson | |
| 7,182,091 B2 | 2/2007 | Maddox | |
| 7,194,842 B2* | 3/2007 | Baird | B66F 11/04 |
| | | | 182/127 |
| 8,424,639 B1 | 4/2013 | Davis | |
| 8,777,254 B1* | 7/2014 | Fowler | A01M 31/02 |
| | | | 280/656 |
| 10,602,738 B2* | 3/2020 | McLeod | A01M 31/025 |
| 2006/0260871 A1* | 11/2006 | Davis | E06C 5/02 |
| | | | 182/127 |
| 2007/0235255 A1* | 10/2007 | Wallace | A01M 31/02 |
| | | | 182/20 |
| 2008/0307717 A1 | 12/2008 | Heppner | |
| 2021/0107389 A1* | 4/2021 | Beiler | B60P 1/02 |

* cited by examiner

PORTABLE, COLLAPSIBLE OCEAN FISHING AND GAME HUNTING SYSTEM

CROSS REFERENCE TO RELATED APPLICATIONS

This application claims benefit of U.S. Provisional Application 62/994,994 filed Mar. 26, 2020, which is incorporated herein.

FIELD OF INVENTION

The present invention relates to the field of portable, collapsible, ocean/lake fishing and game hunting platform and shelter systems.

BACKGROUND

Sportsmen engaging in hunting or fishing activities often use various platform and/or hide systems to conceal themselves from game animals or provide shelter from the sun or adverse weather, such as rain or snow. Any number of systems have been available in commerce for many years, with both tree-mounted deer stands and ground systems widely available.

Among the prior art systems can generally be found single seats mounted atop a ladder-type tripod, a stand that is wheeled to locations via an ATV, and towers that are raised by means of hydraulics. Some are easily hitched for transporting, others easily portable and skeletally secure, while still other devices are easy to store. Many are complex in design and complicated to assemble for use, others are top-heavy and susceptible to being blown over in forceful gales or otherwise unstable.

The invention provides much-needed improvements in fishing/hunting platform systems. Compared with those in the prior art, the disclose platform offers increased platform stability and safety and ease of set-up and breakdown. The platform uses a frame that can be folded and unfolded by a single person. It has increased efficiency of construction and can be easily transported using an integrated wheel mechanism. It further offers compactness and ease of storage by folding into a stowed configuration.

Within the field, there is a need for further improvement and simpler designs to provide a more stable and rugged platform. The current invention includes many improved features that include:

Extensive horizontal and diagonal bracing that provides more structural stability in high winds and/or strong tides.
Constructed of durable metal.
Simple and easy to set up and tear down, requiring only one person.
Requires no tools to set up nor assemble.
Can be used in water that is 4 to 5 feet deep
Portable by hand and towable by motor vehicle and easier to pull through dense forest growth.
Possesses fewer moving parts that need maintenance or that will wear out or break.
Lightweight; a wider segment of people can safely and easily use the platform to fish and hunt.
Easier to manufacture.
Requires less storage space, as it folds virtually flat.
Possesses lower horizontal braces to prevent toppling/sinking when in water.
Firmly implants into ocean/lake bottom.
Can be transported without having to be loaded up and onto a vehicle.
Features the depth and width to accommodate two adult males.
A standalone mechanism that does not require attachment to something, i.e., a tree, to operate.

Based on the foregoing, there is a need in the hunting and fishing field for a platform that offers these features not exhibited by currently available platform used for hunting and fishing.

SUMMARY

In an embodiment, a portable, collapsible system for water body fishing and game hunting comprises a folding frame with an attached platform, all made from galvanized aluminum. The folding frame including at least a front left and front right vertical pipe, and a left bent angle and right bent angle pipe, with the left bent angle and right bent angle pipe joined at a vertex with an attached tow receiver plate supporting a towing hitch. The folding frame further comprising horizontal and diagonal braces attachable and connecting the at least front left and front right vertical pipe to the left bent angle and right bent angle pipe with a lower left horizontal brace and lower right horizontal brace attached to a lower rear horizontal brace and lower front horizontal brace so as to pivot. The folding frame further comprising a rear horizontal stability brace/platform holder and a front horizontal stability brace/platform holder attachable to a left side horizontal stability brace/platform holder and a right side horizontal stability brace/platform holder, with the attached rear horizontal stability brace/platform holder, front horizontal stability brace/platform holder, left side horizontal stability brace/platform holder, and right side horizontal stability brace/platform holder supporting a platform. The attachable components facilitate folding and collapsing the folding frame, including the left side horizontal stability brace/platform holder and the right side horizontal stability brace/platform holder attached to the front left and front right vertical pipe and the left bent angle and right bent angle pipe so as to pivot allowing the platform to fold down opposite from the vertex.

In an embodiment, method of constructing a platform for use by a sportsman comprises the steps of constructing a folding frame made from galvanized aluminum; providing the folding frame with at least a front left and front right vertical pipe, and a left bent angle and right bent angle pipe; joining the left bent angle and right bent angle pipes together to define a vertex with an attached tow receiver plate supporting a towing hitch; including on the folding frame horizontal and diagonal braces attachable and connecting the at least front left and front right vertical pipe to the left bent angle and right bent angle pipe; attaching a right horizontal brace and a left horizontal brace to respectively connect the right bent angle pipe to the front right vertical pipe and the left bent angle pipe to the left front vertical pipe so as to pivot with a front horizontal brace rigidly connecting the left front vertical pipe and the right front vertical pipe and a rear horizontal brace rigidly connecting the left bent angle pipe to the right bent angle pipe; positioning on the upper portion of the folding frame a rear horizontal stability brace/platform holder and a front horizontal stability brace/platform holder attachable to a left side horizontal stability brace/platform holder and a right side horizontal stability brace/platform holder, with the attached rear horizontal stability brace/platform holder, front horizontal stability brace/platform holder, left side horizontal stability brace/platform holder, and right side horizontal stability brace/platform holder supporting a platform; and the attachable components facilitate folding and collapsing the folding frame including the left side horizontal stability brace/platform holder and the right side horizontal stability brace/platform holder attached to the front left and front right vertical pipe and the left bent angle and right bent angle pipe so as to pivot allowing the platform to fold down opposite from the vertex.

In an embodiment, a collapsible elevated stand for fishing and hunting, comprises a folding frame supporting a platform. The folding frame including at least a front left and front right vertical pipe, and a left bent angle and right bent angle pipe, with the left bent angle and right bent angle pipe joined at a vertex with an attached tow receiver plate supporting a towing hitch, and a front horizontal support connecting the front left and front right vertical pipe and a rear horizontal support connecting the left bent angle and right bent angle. The folding frame further comprising horizontal and diagonal braces attachable and connecting the at least front left and front right vertical pipe to the left bent angle and right bent angle pipe with a lower left horizontal brace and a lower right horizontal brace attachable to a lower rear horizontal brace and a lower front horizontal brace. The folding frame further comprising a set of connected rear horizontal stability brace/platform holder, front horizontal stability brace/platform holder, left side horizontal stability brace/platform holder, and right side horizontal stability brace/platform holder. The attachable components facilitate folding and collapsing the folding frame including the left side horizontal stability brace/platform holder and the right side horizontal stability brace/platform holder attached to the rear horizontal stability brace/platform holder and the front horizontal stability brace/platform holder so as to pivot allowing the platform to fold down opposite from the vertex.

Advantages:

Stand Hunters:

Platform device is more stable with diagonal braces, which prevent leaning and the 'rickety' condition that often occurs in towers without braces.

Uses an integrated trailer hitch and attached wheels making it is more easily transported.

Erected very quickly into operating position, without tools.

More easily constructed, with fewer moving parts and with simple welds and bolts.

Easily folded and unfolded for purposes of transport, storage or operation.

May be towed by a motor vehicle or pulled by hand through sand or brush

More compact, folds virtually flat and thus is easier and takes less room to store.

Sturdy enough to support the weight of two average adult males.

Fishermen:

Safely fish above and out of boisterous, balance-sabotaging tides or waves.

Safely fish above and out of the reach of potentially lethal ocean predators.

Forest Game Hunters:

Discreetly hunt with decreased scent-detection by prey.

Use the portable, collapsible walls and 'roof' for protection from wind, rain, snow.

Operate the device without attaching it to a tree

Readily break down the system in areas in which overnight occupation is prohibited.

Aim and fire at a downward angle, which decreases hunting accidents.

All Sportsmen:

Safer from possibility of toppling due to wind.

May catch and secure food.

May relax in nature.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Preferred embodiments of the present invention and their advantages may be understood by referring to FIGS. 1-5, wherein like reference numerals refer to like elements.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

Figure 1:
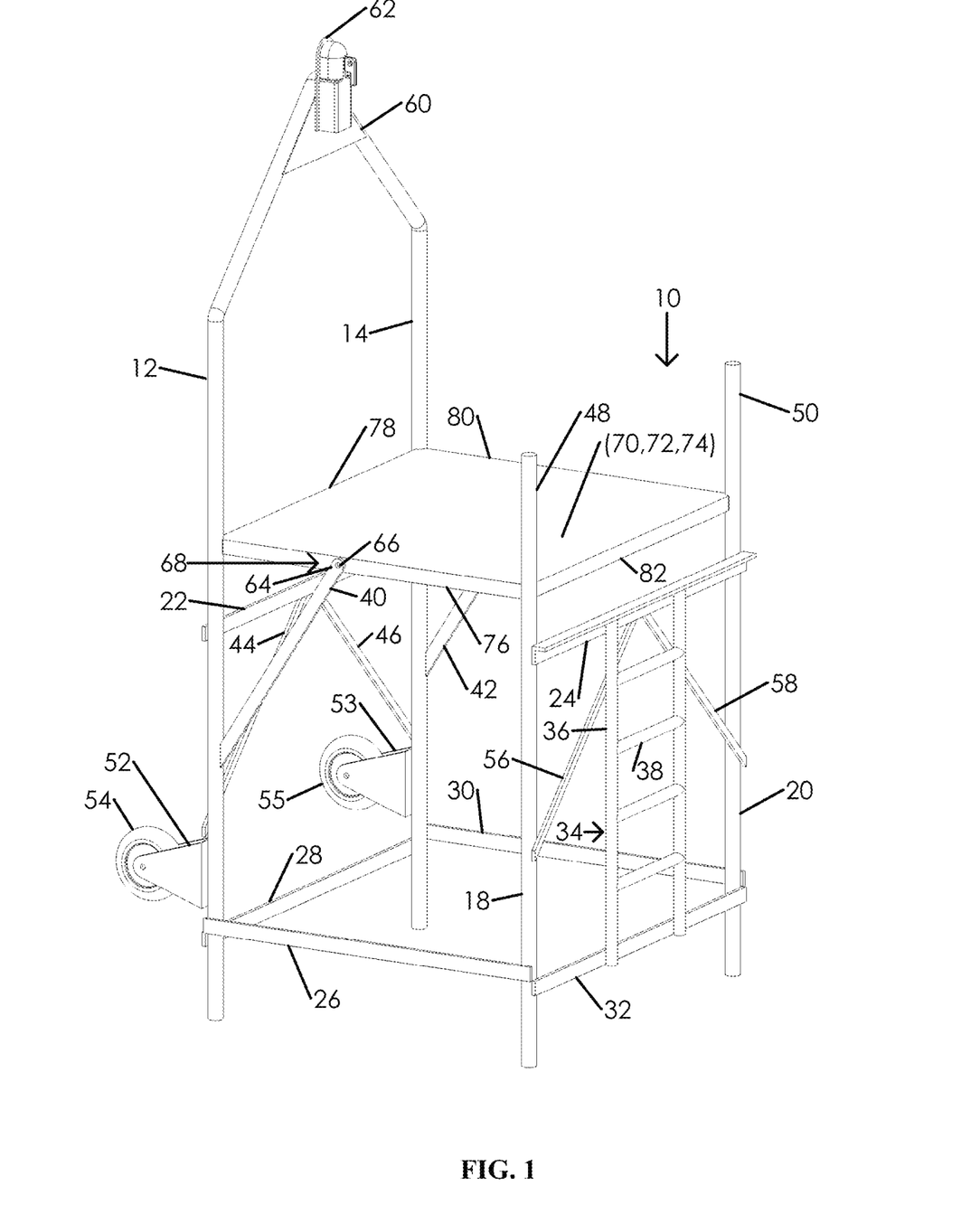
FIG. 1 depicts an exemplary ¾ view illustrating a sportsman's platform device, in operation, and showing its general features, according to an embodiment of the present invention.

FIG. 1 shows an exemplary embodiment of a perspective view of the present platform device 10 in an unfolded configured for operation. Platform device 10 comprises a frame of front left 18 and front right 20 vertical pipes, left bent angle 12 and right bent angle 14 pipes, all of which are connected by and attached to lower left horizontal brace 26, lower right horizontal brace 30, left side horizontal stability brace/platform holder 76 and right side horizontal stability brace/platform holder 80. Lower rear horizontal brace 28, lower front horizontal brace 32, rear horizontal stability brace/platform holder 78 and front horizontal stability brace/platform holder 82 further stabilize the device 10, as do the upper rear horizontal brace 22, the upper front horizontal brace 24, the left side diagonal stability brace 40, the right side diagonal stability brace 42, the rear left diagonal stability brace 44 and the rear right diagonal stability brace 46. Lower left horizontal brace 26 and lower right horizontal brace 30 attach to either lower rear horizontal brace 28 or lower front horizontal brace 32 to facilitate folding the platform device 10 into a collapsed configuration. Front left 18 and front right 20 vertical pipes can also each respectively include left diagonal brace 56 and right diagonal brace 58 permanently connected to upper front horizontal brace 24. Left bent angle 12 and right bent angle 14 pipes can also each respectively include rear left diagonal stability brace 44 and the rear right diagonal stability brace 46 permanently connected to upper rear horizontal brace 22.

Appropriately-spaced rungs 38 on ladder 34 allow an operator to climb up to the platform 16. Tow receiver plate 60 provides the base on which tow hitch 62 is affixed and on which the tow receiver (not shown) rests. Left wheel plate 52 and right wheel plate 53 serve as mounts for left wheel 54 and right wheel 55. When platform device 10 is in collapsed configuration, left wheel 54 and right wheel 55 touched the ground or road and allow the platform device 10 to be pulled or towed. Platform 16 is where a sportsman (e.g., hunter or fisherman) may stand or sit and place his sports equipment. Lower front 26, lower rear 28, lower left 30 and lower right 32 horizontal braces sit seven (7) inches (in an exemplary embodiment) above the bottoms of the left bent angle pipe 12, right bent angle pipe 14, left front pipe 18 and right front pipe 20, which allows the lowest part of the pipes 12, 14, 18 and 20 to sink into the soft layer of an ocean floor or lake bottom only up to the level of the four lower horizontal braces 26. 28, 30 and 32.

The structural components of the platform device 10 can be constructed from aluminum to provide structural strength in a lightweight design. The aluminum can be galvanized to improve resistance to corrosion and deterioration using sodium hydroxide or zinc. Both methods provide acceptable protection to the aluminum structure.

Figure 2:
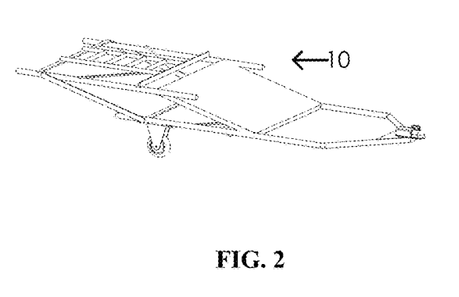
FIG. 2 depicts an exemplary perspective side view of the platform device in collapsed position, ready to be pulled or towed, according to an embodiment of the present invention.

FIG. 2 depicts an exemplary perspective side view of the platform device in a collapsed position, ready to be pulled or towed. With platform device 10 collapsed as shown, an operator can manually pull device 10 from storage to a receiver hitch (not shown) on a vehicle to and secure trailer hitch 62 to the receiver hitch for towing. Operator can tow platform device 10 to motor vehicle parking near a destination. The operator can separate the trailer hitch 62 from the receiver hitch and manually pull platform device 10 by hand to a fishing/hunting spot.

The operator can unfold platform device 10 by uprighting the front frame—composed by the of the front left pipe 18 and right front pipe 20 accomplished by unfolding and elevating front left pipe 18 and front right pipe 20. Uprights 48 and 50 extend upward from pipes 18 and 20 respectively to serve as handholds when climbing rungs 38 and as attachments and/or supports for attached walls and roof. Once platform device 10 is fully unfolded (when pipes 18, 20, 12 and 14 are all upright and the platform is parallel to the ground), the operator removes cotter key 64 from openings 66 and 68 in left side diagonal stability brace 40 and left side horizontal stability brace 76. Operator raises left side diagonal stability brace 40 and lines up openings 66 and 68. The operator then re-inserts cotter key 64 into aligned openings 66 and 68. The operator then repeats the process on the right side: removes cotter key 70 from openings 72 and 74, in the right side diagonal stability brace 42 and left side horizontal stability brace 80 and raises right side diagonal stability brace 42 to line up openings 72 and 74. The operator re-inserts cotter key 70 into aligned openings 72 and 74. When operator is ready to re-fold the device, the process is reversed.

The operator can climb rungs 38 of ladder 34 (lower front horizontal brace 32 and horizontal stability brace/platform holder 82 may also be used during ascending) to platform 16, whereupon the operator may place chair, fishing rod, tackle or other equipment beside him on the platform 16. The operator may affix optional walls/roof with cotter keys. The operator may proceed to fish or hunt.

Figure 3:
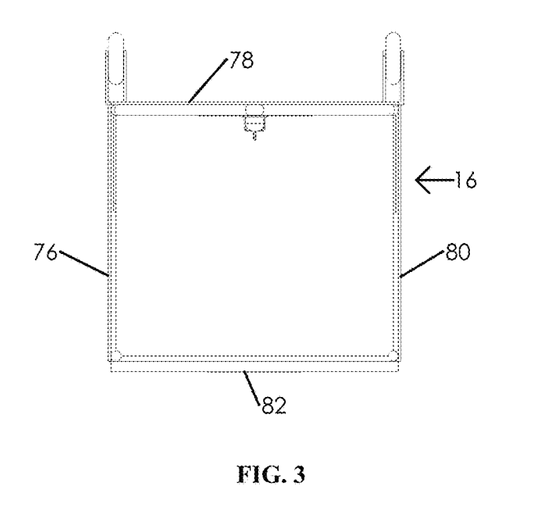
FIG. 3 depicts an exemplary top view looking straight down onto the surface of the platform, according to an embodiment of the present invention.

FIG. 3 depicts an exemplary top view looking straight down onto the surface of the platform. Left side horizontal stability brace/platform holder 76, right side horizontal stability brace/platform holder 80, rear horizontal stability brace/platform holder 78, and front horizontal stability brace/platform holder 82 connect together to form a support frame for platform 16. Platform 16 secures to this frame using suitable connectors/fasteners, welds, or other types of bonding processes to firmly fix platform 16 in place.

Figure 4:
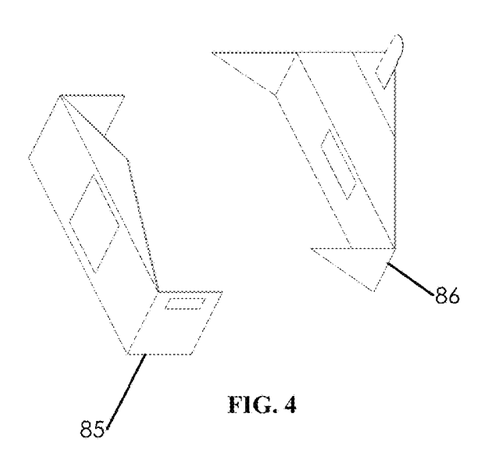
FIG. 4 depicts exemplary attachable walls and roof to the platform, according to an embodiment of the present invention.

FIG. 4 depicts exemplary attachable walls and roof to the platform. As shown, the attachable walls and roofs compose two half structures 85 and 86. The first half structure 85 can compose one wall and at least portions of two other walls and part of the roof. The second half structure 86 can compose another wall and at least part of two other walls. Various other configurations are possible including attachable four separate walls and one roof, or two halves composed of two complete walls and a portion of the roof. The attachable two half structures can be attached either to the platform 16 or the left side horizontal stability brace/platform holder 76 and right side horizontal stability brace/platform holder 80 or rear horizontal stability brace/platform holder 78 and front horizontal stability brace/platform holder 82 or combinations thereof.

Figure 5:
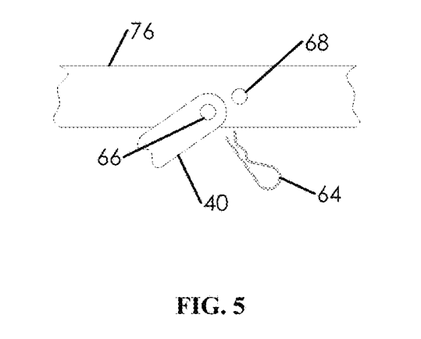
FIG. 5 depicts exemplary details of a cotter key that inserts into openings to secure the platform in an open, non-collapsed configuration, according to an embodiment of the present invention.

FIG. 5 depicts exemplary details of a cotter key and pin arrangement that inserts into openings to secure the platform in an open, non-collapsed configuration. In an exemplary embodiment, left side horizontal stability brace 76 can include an opening 68 into which a cotter bolt (not shown) can be inserted and secured in place by a cotter pin 64. As depicted, left side diagonal stability brace 40 includes opening 66 for receiving the cotter bolt and securing to the left side horizontal stability brace 76 using cotter pin 64. Alternatively, either the left side horizontal stability brace 76 or the left side diagonal stability brace 40 can have a cotter bolt directly integrated within omitting the need for a separate cotter bolt inserted into openings 66 and 68. The arrangement on the right side of cotter key 70 and openings 72 and 74 in the right side diagonal stability brace 42 and left side horizontal stability brace 80 can be essentially identical. An identical cotter key and pin arrangement can be used to attach the various components to facilitate collapsing the platform device 10 into a collapsed configuration.

Insofar as the description above and the accompanying drawing disclose any additional subject matter that is not within the scope of the single claim below, the inventions are not dedicated to the public and the right to the one or more applications to claim such additional inventions is reserved.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The foregoing has described methods and systems for a patient movement monitoring and feedback system that are given for illustration and not for limitation and uses. Thus, the inventions are limited only by the appended claims. Although the inventions have been described in accordance with the embodiments shown, one of ordinary skill in the art will readily recognize that there could be variations to the embodiments and those variations would be within the spirit and scope of the present inventions. Accordingly, many modifications may be made by one of ordinary skill in the art without departing from the spirit and scope of the appended claims.

Particular terminology used when describing certain features or aspects of the embodiments should not be taken to imply that the terminology is being redefined herein to be restricted to any specific characteristics, features, or aspects with which that terminology is associated. In general, the terms used in the following claims should not be construed to be limited to the specific embodiments disclosed in the specification, unless the above Detailed Description section explicitly defines such terms. Accordingly, the actual scope of the claims encompasses not only the disclosed embodiments, but also all equivalent ways of practicing or implementing the claimed subject matter.

The above detailed description of the embodiments is not intended to be exhaustive or to limit the disclosure to the precise embodiment or form disclosed herein or to the particular fields of usage mentioned above. While specific embodiments and examples are described above for illustrative purposes, various equivalent modifications are possible within the scope of the disclosure, as those skilled in the relevant art will recognize. Also, the teachings of the embodiments provided herein can be applied to other systems, not necessarily the system described above. The elements and acts of the various embodiments described above can be combined to provide further embodiments.

Any patents, applications and other references that may be listed in accompanying or subsequent filing papers, are incorporated herein by reference. Aspects of embodiments can be modified, if necessary, to employ the systems, functions, and concepts of the various references to provide yet further embodiments.

In light of the above "Detailed Description," the Inventors may make changes to the disclosure. While the detailed description outlines possible embodiments and discloses the best mode contemplated, no matter how detailed the above appears in text, embodiments may be practiced in a myriad of ways. Thus, implementation details may vary considerably while still being encompassed by the spirit of the embodiments as disclosed by the inventors. As discussed herein, specific terminology used when describing certain features or aspects should not be taken to imply that the terminology is being redefined herein to be restricted to any specific characteristics, features, or aspects of the embodiments with which that terminology is associated.

While certain aspects are presented below in certain claim forms, the inventors contemplate the various aspects in any number of claim forms. Accordingly, the inventors reserve the right to add additional claims after filing the application to pursue such additional claim forms for other aspects.

The above specification, examples and data provide a description of the structure and use of exemplary implementations of the described systems, articles of manufacture and methods. It is important to note that many implementations can be made without departing from the spirit and scope of the disclosure.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

The foldable walls with 'roof' sections may be attached to upper part of platform, to protect hunters from elements as well as prevent olfactory detection by game.

The frame may be of variable sizes manufactured with increased width to provide more room for sportsman.

The front left 18 and right 20 vertical pipes can be elongated to extend 3 feet above platform 16 and connected to the left bent angle pipe 12 and right bent angle pipe 14 via horizontal braces (forming a square parallel to and of the same shape as the four stability braces/platform holders 76, 78, 80 and 82) to form a rail for enhanced game hunting to serve as a firing rest for increased aim accuracy or serve as a grip for general balance.

Base feet for a forest floor can be installed under each of the vertical (12, 14, 18 and 20) pipes to provide increased stability.

Sturdier tires and a high-speed axle can be installed for long-distance road use.

The platform device in transport position can also serve as a surface upon which captured game may towed.

The platform device may be custom-painted in 'camouflage' pattern to allow it to blend in.

The tower may be used as safe height elevator for photographers.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

I claim:

1. A portable, collapsible system for water body fishing and game hunting, comprising:
    a folding frame with an attached platform, all made from galvanized aluminum;
    the folding frame including at least a front left and front right vertical pipe, and a left bent angle and right bent angle pipe, with the left bent angle and right bent angle pipe joined at a vertex with an attached tow receiver plate supporting a towing hitch;
    the folding frame further comprising horizontal and diagonal braces attachable and connecting the at least front left and front right vertical pipe to the left bent angle and right bent angle pipe with a lower left horizontal brace and lower right horizontal brace attached to a lower rear horizontal brace and lower front horizontal brace so as to pivot;
    the folding frame further comprising a rear horizontal stability brace/platform holder and a front horizontal stability brace/platform holder attachable to a left side horizontal stability brace/platform holder and a right side horizontal stability brace/platform holder, with the attached rear horizontal stability brace/platform holder, front horizontal stability brace/platform holder, left side horizontal stability brace/platform holder, and right side horizontal stability brace/platform holder supporting a platform; and
    wherein attachable components facilitate folding and collapsing the folding frame, including the left side horizontal stability brace/platform holder and the right side horizontal stability brace/platform holder attached to the front left and front right vertical pipe and the left bent angle and right bent angle pipe so as to pivot allowing the platform to fold down opposite from the vertex; and
    whereby horizontal and diagonal braces attachable and connecting the at least front left and front right vertical pipe to the left bent angle and right bent angle pipe with the lower left horizontal brace and lower right horizontal brace attached to the lower rear horizontal brace and lower front horizontal brace facilitate pivoting all attachable components, with all the elements attachable to one another.

2. The portable, collapsible system for ocean fishing and game hunting of claim 1, further comprising an axle supporting a pair of wheels.

3. The portable, collapsible system for ocean fishing and game hunting of claim 1, wherein the axle further comprises a high speed axle.

4. The portable, collapsible system for ocean fishing and game hunting of claim 1, wherein the attachable components comprise cotter key and pin fasteners to connect pairs of the following:
- horizontal and diagonal braces;
- front left and front right vertical pipe;
- left bent angle and right bent angle pipe;
- lower left horizontal brace and lower right horizontal brace; and
- lower rear horizontal brace and/or lower front horizontal brace.

5. The portable, collapsible system for ocean fishing and game hunting of claim 1, wherein a shelter structure comprised of four walls and/or a roof can be attached to at least one of the following:
- the platform;
- the left side horizontal stability brace/platform holder;
- the right side horizontal stability brace/platform holder;
- rear horizontal stability brace/platform holder; and
- front horizontal stability brace/platform holder.

6. The portable, collapsible system for ocean fishing and game hunting of claim 1, wherein the front left and front right vertical pipes each respectively include a left diagonal brace and a right diagonal brace permanently connected to an upper front horizontal brace connecting the front left and front right vertical pipes.

7. The portable, collapsible system for ocean fishing and game hunting of claim 1, wherein the left bent angle and right bent angle pipes each respectively include a rear left diagonal stability brace and a rear right diagonal stability brace permanently connected to an upper rear horizontal brace connecting the left bent angle and right bent angle pipes.

8. A method of constructing a platform for use by a sportsman, comprising the steps of:
- constructing a folding frame made from galvanized aluminum;
- providing the folding frame with at least a front left and front right vertical pipe, and a left bent angle and right bent angle pipe;
- joining the left bent angle and right bent angle pipes together to define a vertex with an attached tow receiver plate supporting a towing hitch;
- including on the folding frame horizontal and diagonal braces attachable and connecting the at least front left and front right vertical pipe to the left bent angle and right bent angle pipe;
- attaching a right horizontal brace and a left horizontal brace to respectively connect the right bent angle pipe to the front right vertical pipe and the left bent angle pipe to the left front vertical pipe so as to pivot with a front horizontal brace rigidly connecting the left front vertical pipe and the right front vertical pipe and a rear horizontal brace rigidly connecting the left bent angle pipe to the right bent angle pipe;
- positioning on the upper portion of the folding frame a rear horizontal stability brace/platform holder and a front horizontal stability brace/platform holder attachable to a left side horizontal stability brace/platform holder and a right side horizontal stability brace/platform holder, with the attached rear horizontal stability brace/platform holder, front horizontal stability brace/platform holder, left side horizontal stability brace/platform holder, and right side horizontal stability brace/platform holder supporting a platform; and
- wherein attachable components facilitate folding and collapsing the folding frame including the left side horizontal stability brace/platform holder and the right side horizontal stability brace/platform holder attached to the front left and front right vertical pipe and the left bent angle and right bent angle pipe so as to pivot allowing the platform to fold down opposite from the vertex.

9. The method of constructing a platform for use by a sportsman of claim 8, further comprising the step of integrating an axle supporting a pair of wheels.

10. The method of constructing a platform for use by a sportsman of claim 8, further comprising the step of integrating a high speed axle and a pair of wheels.

11. The method of constructing a platform for use by a sportsman of claim 8, wherein the attachable components comprise cotter key and pin fasteners to connect pairs of the following:
- horizontal and diagonal braces;
- front left and front right vertical pipe;
- left bent angle and right bent angle pipe;
- lower left horizontal brace and lower right horizontal brace; and
- lower rear horizontal brace and/or lower front horizontal brace.

12. The method of constructing a platform for use by a sportsman of claim 8, further comprising the step attaching a shelter structure comprised of four walls and/or a roof to at least one of the following:
- the platform;
- the left side horizontal stability brace/platform holder;
- the right side horizontal stability brace/platform holder;
- rear horizontal stability brace/platform holder; and
- front horizontal stability brace/platform holder.

13. The method of constructing a platform for use by a sportsman of claim 8, wherein the front left and front right vertical pipes each respectively include a left diagonal brace and a right diagonal brace permanently connected to an upper front horizontal brace connecting the front left and front right vertical pipes.

14. The method of constructing a platform for use by a sportsman of claim 8, wherein the left bent angle and right bent angle pipes each respectively include rear a left diagonal stability brace and a rear right diagonal stability brace permanently connected to an upper rear horizontal brace connecting the left bent angle and right bent angle pipes.

15. A collapsible elevated stand for fishing and hunting, comprising:
- a folding frame supporting a platform;
- the folding frame including at least a front left and front right vertical pipe, and a left bent angle and right bent angle pipe, with the left bent angle and right bent angle pipe joined at a vertex with an attached tow receiver plate supporting a towing hitch, and a front horizontal support connecting the front left and front right vertical pipe and a rear horizontal support connecting the left bent angle and right bent angle;
- the folding frame further comprising horizontal and diagonal braces attachable and connecting the at least front left and front right vertical pipe to the left bent angle and right bent angle pipe with a lower left horizontal brace and a lower right horizontal brace attachable to a lower rear horizontal brace and a lower front horizontal brace;
- the folding frame further comprising a set of connected rear horizontal stability brace/platform holder, front horizontal stability brace/platform holder, left side horizontal stability brace/platform holder, and right side horizontal stability brace/platform holder; and wherein attachable components facilitate folding and collapsing the folding frame including the left side horizontal stability brace/platform holder and the right side horizontal stability brace/platform holder attached to the rear horizontal stability brace/platform holder and the front horizontal stability brace/platform holder so as to pivot allowing the platform to fold down opposite from the vertex;

whereby horizontal and diagonal braces attachable and connecting the at least front left and front right vertical pipe to the left bent angle and right bent angle pipe with the lower left horizontal brace and lower right horizontal brace attached to the lower rear horizontal brace and lower front horizontal brace facilitate pivoting of all attachable components when attached to one another.

16. The collapsible elevated stand for fishing and hunting of claim 15, further comprising an axle supporting a pair of wheels.

17. The collapsible elevated stand for fishing and hunting of claim 15, wherein the attachable components comprise cotter key and pin fasteners to connect pairs of the following:
- horizontal and diagonal braces;
- front left and front right vertical pipe;
- left bent angle and right bent angle pipe;
- lower left horizontal brace and lower right horizontal brace; and
- lower rear horizontal brace and/or lower front horizontal brace.

18. The collapsible elevated stand for fishing and hunting of claim 15, wherein a shelter structure comprised of four walls and/or a roof can be attached to at least one of the following:
- the platform;
- the left side horizontal stability brace/platform holder;
- the right side horizontal stability brace/platform holder;
- rear horizontal stability brace/platform holder; and
- front horizontal stability brace/platform holder.

19. The collapsible elevated stand for fishing and hunting of claim 15, further comprising:
wherein the front left and front right vertical pipes each respectively include a left diagonal brace and a right diagonal brace permanently connected to an upper front horizontal brace connecting the front left and front right vertical pipes; and
a ladder with a least four rungs connects to an upper front horizontal brace and a lower front horizontal brace and provides for increase longitudinal stability.

20. The collapsible elevated stand for fishing and hunting of claim 15, further comprising:
wherein the lower left horizontal brace and a lower right horizontal brace left bent angle and right bent angle pipes each respectively include a rear left diagonal stability brace and a rear right diagonal stability brace permanently connected to an upper rear horizontal brace connecting the left bent angle and right bent angle pipes; and
wherein the lower left horizontal brace and lower right horizontal brace and the left horizontal stability brace/platform holder and the right horizontal stability brace/platform holder attach to the left bent angle pipe and the right bent angle pipe and front left vertical pipe and the front right vertical pipe so as to pivot to collapse or uncollapse the stand.

* * * * *